Oct. 20, 1942.  C. N. BERGSTROM  2,299,373
TRANSMISSION
Filed Sept. 23, 1939

Inventor:
C. N. Bergstrom
By
Attorney

Patented Oct. 20, 1942

2,299,373

UNITED STATES PATENT OFFICE 2,299,373

TRANSMISSION

Carl N. Bergstrom, Portland, Oreg.

Application September 23, 1939, Serial No. 296,192

3 Claims. (Cl. 192—53)

The main object of my invention is to construct a clutch mechanism which is adapted for use in a vehicle transmission for the obtaining of various or desired speed ratios without the engaging or disengaging of the gears thereof.

The second object is to provide means whereby said ratio changes may be accomplished with the gears of said transmission in full mesh at all times.

The third object is to provide a clutch mechanism whereby speed ratios may be obtained at various speeds of the vehicle with no danger of loss of control thereof. In other words, the various engaging parts may be shifted at any time without unison of gear speed.

The fourth object is to produce a clutch mechanism which is simple and durable of construction and the shifting thereof is exceedingly silent. Also I employ a series of engaging units which are similar of construction in each of the speed selecting parts which simplifies the assembly of my transmission and also the cost of production thereof.

The fifth object is to produce a clutch mechanism which is readily adaptable to the new remote shifting controls and also may be practically shifted by automatic means such as governor control.

I accomplish these and other objects in the manner set forth in the following specification as illustrated in the accompanying drawing, in which.

Similar numerals refer to similar parts throughout the several views.

Figure 1:
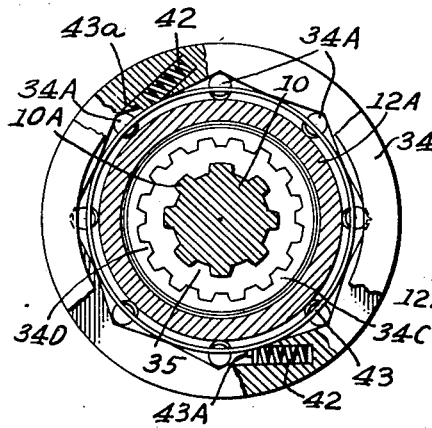
Fig. 1 is a section taken on the line 1—1 of Fig. 3 to show detail of construction and the springs for returning the rollers to neutral position.
Figure 2:
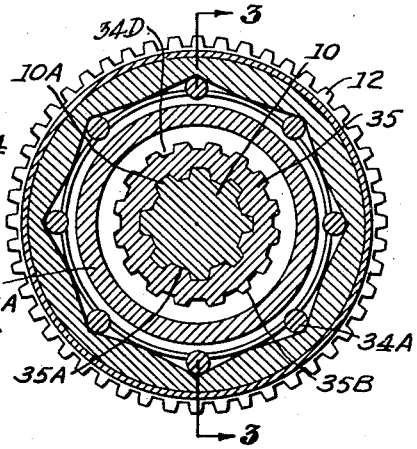
Fig. 2 is a section on line 2—2 of Fig. 3.
Figure 7:
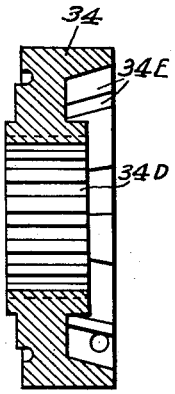
Fig. 7 is a section of the engaging portion.

Referring in detail to the invention, same will be seen to consist of a main shaft 10 journaled in suitable bearings (not shown) upon which shaft are formed the splines 10—A.

Upon the shaft 10 is a driven gear 12 having a conical hub 12—A formed on one side thereof and clutch teeth 12—B formed therein. The gear 12 is preferably provided with a bushing 13.

Slidably mounted on the shaft 10 is a shifting sleeve 35 which is provided with the inner splines 35—A and the outer splines 35—B, the latter of which are provided with pointed ends 35—C which engage the splines 10—A of the main shaft 10 and the outer splines 35—B slidably engage the clutch teeth 12—B of the gear 12.

A cup 34 is slidably mounted on the sleeve 35 and has formed on the interior thereof the splines 34—D. In order to prevent the rollers 34—A from escaping, there is provided a retainer 34—F whose side 34—G is inturned to engage the rollers 34—A.

A locking collar 34—C in the form of a snap ring occupies grooves formed therefor in the splines 35—B. These normally form a stop for the cup 34 against which the cup is urged by the spring 39 which reacts against the shifting collar 36 to which movement is supplied by any of the well known shifting mechanisms now in common use but not shown in the drawing.

Figure 3:
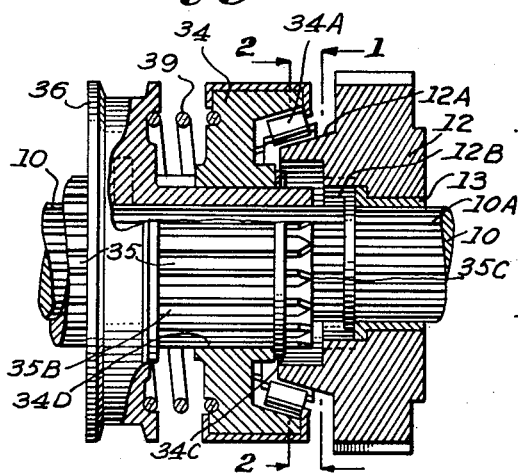
Fig. 3 is a longitudinal section through a clutch unit taken along the line 3—3 in Fig. 2, to more clearly show the construction and wherein the shiftable portion is disengaged from the gear.

It will be noted that the interior of the cup 34 consists of a plurality of polygonal faces 34—E between which and the exterior of the conical hub 12—A are disposed the rollers 34—A which are held in their relative position by means of a cage 43 whose outwardly bent portions 43—A engage the springs 42 which tend to urge the rollers 34—A to neutral or non-driving position, as shown in Figs. 1 and 3. The cage 43 is simply a circular band which is free to rotate with relation to the cup 34 and has openings formed in its flaring flange 43—A to receive the rollers 34—A.

The operation of the device is as follows:

When it is desired to drivably connect the shaft 10 and the gear 12 and the parts are in the position shown in Fig. 3, that is, the gear 12 is free to rotate on the shaft 10, the operator merely causes the shifting mechanism to move the collar 36 and its attached sleeve 35 along the axis of the shaft 10 naturally causing the locking collar 34—C to move with it and permitting the spring 39 to move the cup 34 in the same direction. Within the cup 34 is formed a polygonal recess whose faces 34—E incline longitudinally with relation to the axis and transversely with relation to the radius of the member 34.

Figure 4:
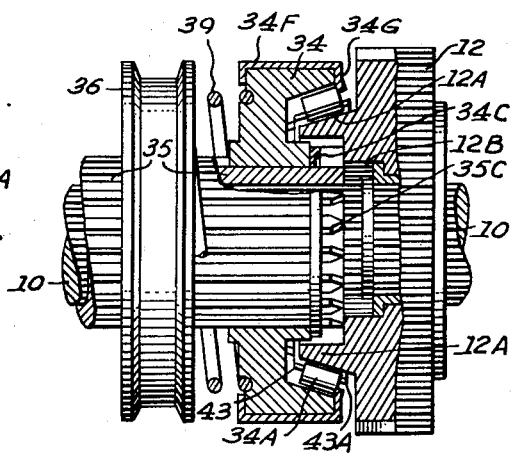
Fig. 4 is a view similar to Fig. 3 showing the shiftable engaging portion engaged with the gear.

It will be noted that so far the ends 35—C of the splines 35—B on sleeve 35 which are preferably pointed, have not yet come into engagement with the clutch teeth 12—B of the gear 12, but in Fig. 4 the rollers 34—A are in engagement with the conical hub 12—A and the relative rotation of the parts 12 and 34 cause the rollers 34—A, the conical hub 12—A and the cup faces 34—E to act as a clutch which brings the parts 12 and 34 to a synchronous speed.

Figure 5:
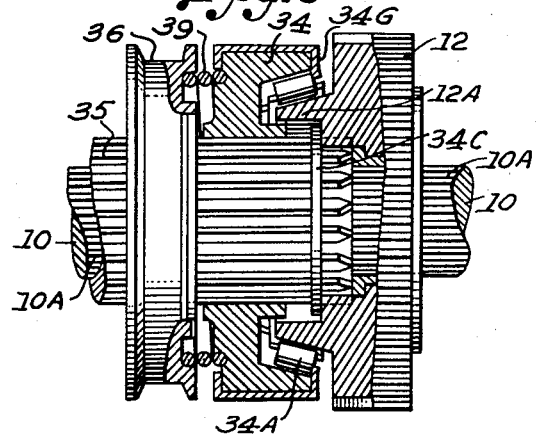
Fig. 5 is a view similar to Fig. 4 but showing the shiftable engaging portion engaged and locked to said gear and constitutes the complete shift.
Figure 6:
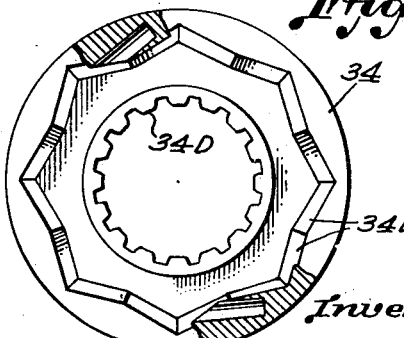
Fig. 6 is a side elevation of Fig. 7 with parts broken away in section.

A further movement of the member 36, that is, to the position shown in Fig. 5, causes the pointed ends 35—C of the splines 35—B to engage the internal teeth 12—B and actually lock the parts 10 and 12 together.

Actually, I have interposed a clutch roller between the driving and driven elements and the clutch is of such a nature that it would drive the parts continually if necessary but for mechanical reasons it is desirable to have the parts lock in a fully clutched position.

While I have referred to certain of the parts as "driving" and "driven," it must be understood that the driving action can be in either direction without departing from the spirit of this invention and that the adaptability of the mechanism herein described is susceptible to many modifications dependent upon the particular requirements of the individual case.

In the application of the present invention to ordinary automobiles, for example, a unit similar to the one described would be used for each forward and reverse speed.

The proper shifting operation in the driving of an automobile requires quite skillful manipulation of the shifting lever to shift the gears wherein they will mesh with each other. Due to improper shifting, there will result a clashing of said gears and oftentimes considerable damage may be done in such improper shifting especially at an accelerated speed of the motor.

There are many occasions when it is desirable to shift the gears when traveling on a hill. If such shifting has not been properly accomplished due to lack of skill and undue speed of the car, the same can then only be controlled by the brakes. Many serious accidents have occurred when the car, being out of gear, has gotten out of control and the brakes have failed.

In my transmission such a condition cannot possibly occur. The shifting of the gripping mechanism may be accomplished under any condition and requires no acceleration of the motor to synchronize the speed of the desired gears, to be meshed, with the speed of the driven shaft. It is impossible to clash the gears thereof as they are in constant mesh.

I have illustrated but a single type of locking mechanism such as collars on the driven shaft gripping their respective gears through rollers interposed therebetween, but it can readily be seen that other means may be used and still be within the scope of my invention.

I claim:

1. In a transmission, the combination of an external gear having a conical hub formed thereon and having an internal gear formed within said hub, a slidable sleeve having an external spline formed thereon concentric with and adapted to mesh with said internal gear, a cup slidably mounted on said slidable sleeve, a spring for urging said slidable sleeve and said cup in opposite directions, means for positively sliding said sleeve, said cup having a recess formed therein in the form of a tapering polygon, a plurality of rollers disposed between said conical hub and the interior of said internal recess, a retainer for holding said rollers in spaced relationship, and springs for urging said rollers toward positions of maximum clearance.

2. In a clutch mechanism the combination of a driving shaft, a gear rotatably mounted on said driving shaft, said gear having a conical hub formed on one side thereof, said hub having an internal gear formed therein spaced from said driving shaft, a shifting sleeve splined upon said driving shaft, said sleeve having gear teeth formed around same adapted to register with the teeth of the internal gear within said conical hub, a cup slidably mounted on said sleeve and splined with relation thereto, said cup having a recess formed therein in the form of a tapering polygon, said conical member occupying a portion of said recess, rollers mounted in the clearance space between said conical member and the sides of said recess, means for urging said rollers toward portions of maximum clearance, a sleeve actuator for sliding said sleeve in a manner to cause the gear thereon to enter said internal gear, and yieldable means between the said sleeve actuator and said cup adapted to yieldably move said cup while said sleeve is moved positively, whereby the teeth in the internal gear and those of the gear formed on said sleeve will be brought into mesh.

3. In a clutch mechanism of the class described, the combination of a splined shaft, a gear rotatably mounted on said shaft, said gear having a conical hub formed thereon and having an internal gear formed therein and an internally and externally splined sleeve slidably mounted on said splined shaft, the external splines on said sleeve being adapted to engage the teeth of said internal gear, a cup slidably mounted on said sleeve in splined relation thereto, said cup having a polygonal tapering interior, yieldable means for slidably actuating said cup, a plurality of rollers disposed between the interior of said cup and the exterior of the cone on said first mentioned gear and spring means for urging said rollers out of a driving relationship.

CARL N. BERGSTROM.